Patented Nov. 28, 1950

2,531,776

UNITED STATES PATENT OFFICE 2,531,776

PROCESS FOR IMPROVING THE PROPERTIES OF NATURAL RESINS AND THE PRODUCTS OBTAINED THEREBY

Ernest D. Lee, Sparta, and Rupert J. Schefbauer, Jr., Hasbrouck Heights, N. J., assignors to Interchemical Corporation, New York, N. Y., a corporation of Ohio No Drawing. Application July 2, 1949, Serial No. 102,956

9 Claims. (Cl. 260—99)

This invention relates to the process for improving the properties of resinous materials obtained from resin-bearing bituminous coals, and the products obtained thereby.

Certain coals, notably the bituminous coal from the Utah coal fields obtained between Castlegate on the north and Salina Canyon on the south, contain substantial percentages, up to 10%, of resinous material consisting for the most part of carbon and hydrogen. Of the various methods that have been proposed to effect separation of the hydrocarbon resin from the coal, the one involving froth flotation, the process of U. S. Patent 1,773,997, appears to be the most widely used. The coal resin concentrate obtained by this technique contains 70–95% of resin. The resinous material is further concentrated by extracting the coal resin concentrate with suitable solvents for the resin, notably hydrocarbon solvents such as petroleum ether, mineral spirits, and the like, to obtain a soluble resin of 95–100% purity.

The exact chemical structure of the complex resinous material obtained by solvent extraction of the coal resin concentrate has never been elucidated. In general appearance it is hard and friable, and is soluble in ordinary hydrocarbon solvents such as petroleum ether, mineral spirits, and the like. Other properties, such as iodine number, acid value, molecular weight, melting point, and the like, vary slightly, depending upon the particular solvent used to extract the resin. A typical resin, obtained by extracting the coal resin concentrate with commercial n-hexane containing less than 25% of aromatics, has the following characteristics:

| | |
|---|---|
| Color | Dark brown |
| Melting point (capillary) | 160°–165° C. |
| Acid value | 6–8 |
| Iodine value (Wijs) | 100–130 |
| Specific gravity (melted) | 1.04–1.06 |
| Molecular weight (cryoscopic) | 732 |
| Carbon | 87.10% |
| Hydrogen | 11.17% |
| Sulfur | 0.30% |
| Nitrogen | 0.96% |
| Ash | 0.45% |

The solvent extracted resinous material described above is undoubtedly a mixture of resins of different molecular weights and possibly different chemical structures. When the resin obtained by extracting coal concentrate with commercial n-hexane solvent is redissolved in 2-methyl pentane to a concentration of 25 to 50% and then diluted to about 10% concentration, a high melting resin is precipitated while lower melting resins remain in solution. High melting resins obtained in this manner are described in the copending application of E. D. Lee and R. J. Schefbauer, Jr., Serial No. 746,857, filed May 8, 1947.

We have now discovered that new and useful resinous products can be obtained by subjecting a solution of coal resin, or of oxidized coal resin prepared according to the method of copending U. S. patent application Serial No. 17,375, filed March 26, 1948, now U. S. Patent 2,488,546, to treatment with an amphoteric metal halide type catalyst at an elevated temperature.

The process of the present invention is preferably carried out, when starting with unoxidized coal resin, by heating the finely divided coal resin spread out to a depth of approximately ¼ to ½ inch in an oven at a temperature of 50° to 15° C. below the softening point of the resin, and thereafter treating a solution of the resulting oxidized resin in an aliphatic or aromatic hydrocarbon solvent with an amphoteric metal halide, such as a boron trifluoride; or amphoteric metal halide complexes, such as boron trifluoride-diethyl ether complex, within the temperature range 50–65° C. Although these metal halides and metal halide complexes are known to be good polymerization catalysts, and there is evidence that they have a polymerizing action on coal resin, it is not known whether their sole effect is to catalyze polymerization. However, for simplicity, they will be referred to hereinafter as polymerization catalysts.

Straight oxidation of coal resin increases the molecular weight and solution viscosity of the resin, the effect increasing the degree of oxidation up to a maximum of about 6–7%, based on the original weight of resin, when the completely oxidized resin becomes insoluble in ordinary petroleum hydrocarbon solvents. Such an insoluble resin has been less useful than a more soluble resin, and, therefore, coal resin is preferably not completely oxidized. There appears to be both an oxidizing and polymerizing effect in heating coal resin in the presence of oxygen, as indicated by increase in molecular weight, solution viscosity and melting point, which last has been increased by as much as about 40° C. However, the oxidation process is difficult to control, and products having reproducible solubilities and stabilities are not easily attained. Again, reaction time is considerable.

In contrast thereto, our invention utilizing an oxidation followed by a treatment with an amphoteric metal halide type catalyst, makes possible the ready control of solubilities and stabilities of products having high molecular weights and solution viscosities.

While an oven oxidation of divided coal resin at a temperature 5°–15° C. below its melting point is preferred, the equivalent continuous process can be used, in which the resin may be fed onto a horizontally moving belt and the belt containing the resin at a desired depth can be passed through a heating chamber at such a rate that by the time it leaves the chamber it will have been oxidized to the desired extent.

The subsequent treatment with a polymerization catalyst is more readily performed after the coal resin has been oxidized. While boron trifluoride ether complex is the preferred catalyst, the obvious equivalent amphoteric metal halide type catalysts may be used. Boron trifluoride gas is somewhat more reactive than its ether complex, but is not preferred for well-known reasons.

Solutions of oxidized coal resin in aliphatic and aromatic hydrocarbon solvents are used. As the catalytic treatment proceeds, difficulties due to decreased solubility make it more difficult to manipulate solutions in aliphatic hydrocarbon solvents, particularly with solutions greater than 50% concentration, as compared with aromatic hydrocarbon solvent solutions. For this reason, solution concentrations of 30–50% are preferred.

Temperature of the treatment with catalyst may be varied over a wide range, f. e., 35°–105° C. Temperatures above 90° C. decompose boron trifluoride, while temperatures between 70°–90° C. split up the boron trifluoride ether complex when this form of catalyst is used. The optimum temperature range for a boron trifluoride catalyst is 55–60° C.

The amount of catalyst used is preferably less than 1%, based on the weight of oxidized coal resin. Larger amounts may be used, but as the percentage is increased, the catalyst reactivity appears to decrease up to approximately 6%. When a boron trifluoride catalyst is used, the optimum concentration is approximately 0.25%.

The following examples are given to illustrate the invention.

*Example 1*

Finely divided coal resin, having a melting point of 160°–165° C., obtained by extraction of crude coal resin with commercial n-hexane, was oxidized in an oven having a continuous conveyor for 6.7 hours at 330° F., the depth of coal resin on the continuous belt being approximately ½ inch. Solutions containing 50% of the oxidized coal resin in a paraffin type petroleum hydrocarbon solvent having a dimethyl sulfate value of 2.5 and a boiling range of 245–269° C. were prepared. The oxidized resin was then polymerized in solution by bubbling a gas mixture of 3:1 nitrogen:boron trifluoride therethrough at a rate of 60 bubbles per minute, the solution being kept at 55°–60° C. for varying time periods. Results follow:

| Polymerization Time | Viscosity 50% Solution After Polymerization | Melting Point After Polymerization |
|---|---|---|
| | *Poises* | °*C.* |
| Standard: 0 | [1] 150 | [1] 183–187 |
| 2 hours | 270 | 183–187 |
| 3 hours | 650 | 184–188 |
| 4 hours | 900 | 195–200 |

[1] Unpolymerized.

The use of an aromatic solvent, such as toluene, has no effect on the reaction, in that it can be substituted for the solvent used above to obtain results equal to those listed above. The substitution of boron trifluoride ether complex, 48% $BF_3$, 0.55% based on oxidized coal resin weight, gave comparable results. The catalyst is removed by adding $Ca(OH)_2$ slurry in benzene, and filtering, and evaporating the solvent by vacuum distillation to recover the resin in solid form. In this and future examples, viscosities were determined on 50% solutions of polymerized resin in the paraffinic solvent above-identified.

*Example 2*

Finely divided coal resin, having a melting point of 160°–165° C., was oxidized in trays, ½ inch deep, in an oven at 150° C. for varying time periods, and thereafter polymerized in the following manner.

100 grams of oxidized coal resin was dissolved in an equal amount of the paraffinic hydrocarbon solvent of Example 1, and heated to 100°–105° C. Agitation was begun, 2.2 grams of boron trifluoride diethyl ether complex, 48% $BF_3$, was then added, and the reaction permitted to proceed at the same temperature for 4 hours. Then 10 grams of $Ca(OH)_2$ slurry in 100 grams of benzene was added for catalyst removal after the temperature had been reduced to 70°–80° C., the reaction medium being more vigorously agitated thereafter for 1 hour. The batch was then filtered to remove $CaF_2$ and vacuum distilled to remove benzene. Under such conditions, the following changes were noted:

3 hour oxidized coal resin increased in viscosity from 38.5 poises to 223 poises.

4 hour oxidized coal resin increased in viscosity from 46.5 poises to 970 poises.

5 hour oxidized coal resin increased in viscosity from 330 poises to 4,730 poises.

6 hour oxidized coal resin increased in viscosity from 750 poises to 5,500 poises.

The following changes were noted with coal resin oxidized in a continuous conveyor heating chamber at 310° F., for varying time periods, polymerization being the same as with the oven oxidized samples.

4.6 hour oxidation: 35 poises to 105 poises.

6.7 hour oxidation: 97 poises to 208 poises.

9.5 hour oxidation: 150 poises to 628 poises.

10.0 hour oxidation: 240 poises to 570 poises.

*Example 3*

Samples of 4.6 hour 310° F. conveyor oxidized resin were subjected to boron trifluoride diethyl ether complex according to the method disclosed in Example 2, using increasing amounts of the boron trifluoride ether complex catalyst, which contains 48% BF₃, with the following results:

| Per Cent BF₃, Resin Basis | Viscosity After Polymerization, Poises |
|---|---|
| 0.10 | 84 |
| 0.15 | 34 |
| 0.25 | 190 |
| 1.0 | 105 |
| 2.9 | 45 |
| 4.7 | 58 |
| 6.2 | 15 |
| 8.0 | 180 |

*Example 4*

When 6.7 hour 330° F. conveyor oxidized coal resin was treated according to the method disclosed in Example 1 for 4 hours at a temperature of 55°–60° C. using a BF₃ gas rate of 60 bubbles per minute at an influx ratio of nitrogen to BF₃ of 3:1, viscosities of the order of 900 to 990 poises were obtained with the finished resins. Viscosities of the same order are obtained when the ether complex of BF₃ is used under comparable conditions.

*Example 5*

Crude coal resin was extracted with commercial n-hexane, and the purified recovered coal resin, having a melting point of 160°–165° C., dissolved in paraffinic hydrocarbon solvent, previously identified, to form a 50% solution. Using the BF₃ gas rate and make-up of Example 4 for 4 hours at 55°–60° C., the coal resin was polymerized to yield a product having a solution viscosity of 50 poises, compared with 25 poises for the unreacted coal resin. Doubling the flow of BF₃ gas catalyst and increasing the polymerization temperature to 75°–80° C. gave a product having a solution viscosity of 86 poises. The prior reacted resin had a melting point of 178°–183° C., while the latter had a melting point of 180°–185° C., compared with a melting point of 160°–165° C. for the starting resin.

*Example 6*

A 50% solution of 6.7 hour 150° C. conveyor oxidized coal resin in toluene was treated with 2.2%, based on the oxidized coal resin, of boron trifluoride dietherate catalyst with stirring, and heat applied until a temperature of 100° C. was reached. The temperature of the reaction medium was held at 100° C. for 4 hours with stirring, then reduced gradually to 80° C. A slurry of Ca(OH)₂ in toluene, 10% of the weight of oxidized coal resin, was added, and the resin solution concentration reduced to 40% with additional toluene. Rapid stirring was continued for ¾ to 1 hour, the batch was then aerated for removal of ether, then centrifuged to eliminate CaF₂. The toluene was distilled off under vacuum and the resin dried at low temperature. The recovered resin had the following properties: M. P. 195°–225° C., iodine value 79.6, solution viscosity 2,030 poises. This compares with the following corresponding values for n-hexane extracted coal resin: M. P. 160°–165° C., iodine value 130, and solution viscosity 25 poises.

The modified resins prepared according to this invention are useful in printing inks, protective and decorative coatings, and the like.

We claim:

1. Method for improving the properties of a resin derived from resin-bearing coal of the Utah type, which comprises subjecting a solution of the resin to the action of an amphoteric metal halide type catalyst at an elevated temperature.

2. Method for improving the properties of a resin derived from resin-bearing coal of the Utah type, which comprises subjecting said resin to an oxygen containing gas at an elevated temperature at least 5° C. below the softening point of the resin, and thereafter subjecting a solution of the oxidized resin to the action of an amphoteric metal halide type catalyst at an elevated temperature.

3. Method of claim 1, in which the catalyst is boron trifluoride gas.

4. Method of claim 2, in which the catalytic reaction temperature is 55°–60° C.

5. Method of claim 2, in which the catalyst is a boron trifluoride catalyst.

6. Method of claim 2, in which the oxidation step temperature is 5°–15° C. below the softening point of the resin, and the catalytic reaction temperature is 55°–60° C. with a boron trifluoride catalyst.

7. Polymerized coal resin of the Utah type.

8. Polymerized oxidized coal resin of the Utah type.

9. As a new product, a resin of the group consisting of polymerized coal resin of the Utah type and polymerized oxidized coal resin of the Utah type.

ERNEST D. LEE.
RUPERT J. SCHEFBAUER, Jr.

No references cited.